Nov. 2, 1926.
J. M. BROCK
1,605,505
ACETYLENE LAMP
Filed May 1, 1924
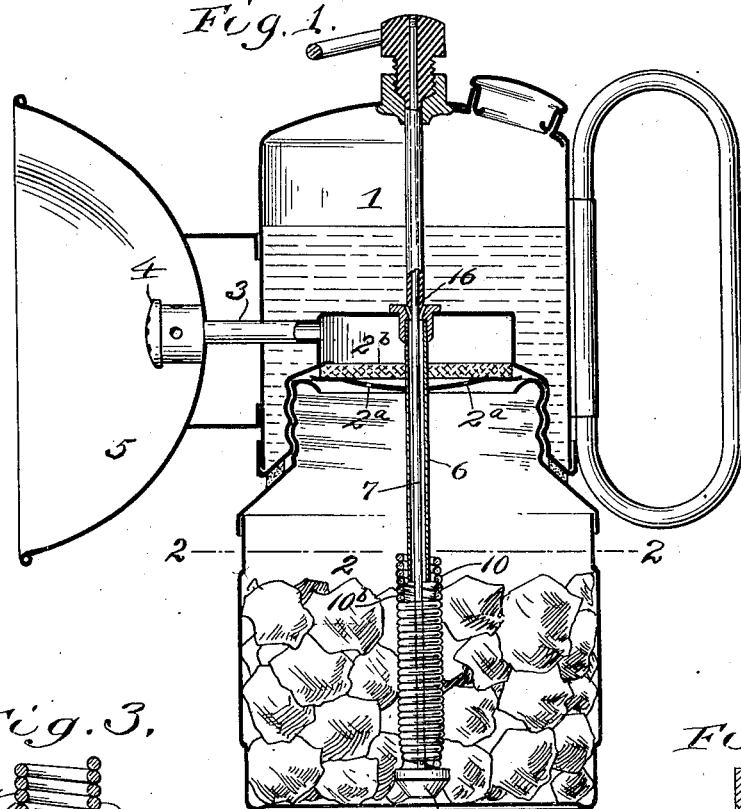
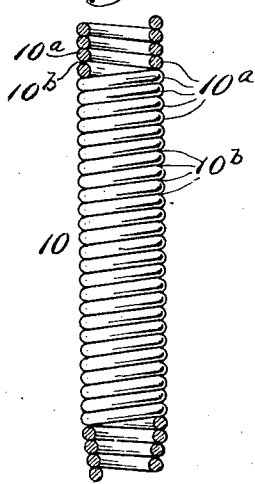
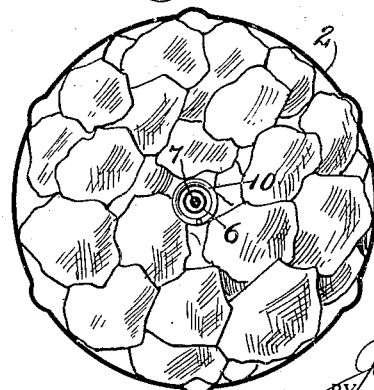
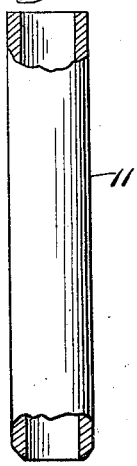
INVENTOR.
John M. Brock
BY Rogers, Kennedy Campbell
ATTORNEYS Patented Nov. 2, 1926.

1,605,505

UNITED STATES PATENT OFFICE.

JOHN M. BROCK, OF BROOKLYN, NEW YORK.

ACETYLENE LAMP.

Application filed May 1, 1924. Serial No. 710,259.

This invention relates to acetylene lamps, such as those illustrated in my prior Letters Patent No. 1,193,985, and contemplates certain improvements which materially simplify the construction and operation of the parts, as will be fully pointed out in the detailed description to follow.

Referring to the drawings:

Fig. 1 is a sectional view, of an acetlyene lamp equipped with my improvements;

Fig. 2 is a transverse section taken on the line 2—2 of Fig. 1 looking downwardly;

Fig. 3 is an enlarged face view partly in section, of a detached portion of the lamp constructed in accordance with my invention; and Fig. 4 illustrates a modification.

The lamp herein shown is of the kind known as the miner's acetylene lamp, comprising the water reservoir receptacle 1 and the carbid receptacle 2, which latter is screw-threaded to the former so as to be detachable therefrom at will for filling or refilling purposes. Water from the receptacle 1 is fed to the carbid of the receptacle 2 through a supply-tube 6 fixed to the bottom of the water receptacle and extended downwardly into the carbid receptacle, the admission of water to the supply-tube being controlled by the valve-sleeve 16 screw-threaded to the top of the water receptacle. The flow of water through the supply-tube 6 is limited by the enclosed rod 7 depending from the valve-sleeve 16 and extended downwardly beyond the supply-tube so as to become embedded in the carbid and provided at its extreme lower end with the tapered head 9 to facilitate the embedding action. As the gas is generated in the carbid receptacle 2, it passes upwardly through the perforated plate 2ª and felt piece 2ᵇ into the burner tube 3, which latter extends horizontally through the water receptacle 1 and is provided with the customary burner head 4 located within the reflector 5. The foregoing parts are substantially as described and illustrated in my prior Letters Patent above referred to and are indicated by the same reference numerals.

In the above patent, automatic means are employed to maintain the proper flow of the water into the carbid receptacle so as to insure a more uniform pressure of the gas and hence a more uniform light. Generally speaking, such means consist of a so-called "float device" or disk adapted to rest upon the carbid in the receptacle and carrying a depending tube which surrounds the embedded portion of the rod 7 and constitutes in effect a telescopic extension of the fixed supply-tube 6, the arrangement being such that the carbid in expanding under the action of water lifts the float-device slowly and gradually and slides the attached telescopic tube upwardly along the fixed supply-tube. As the telescopic tube is thus lifted, it not only raises the level at which the water flows into the carbid receptacle, but it acts to break up the sludge resulting from the slaking of the carbid and permits the water to escape through the sludge to the unslaked carbid, all as fully set forth in said patent. This automatic device, while thoroughly efficient in operation, is made of light weight material and therefore somewhat delicate and liable to damage in the hands of careless or ignorant workmen. Thus, and especially in the case of the smaller lamps, it often occurs that in removing and replacing the carbid receptacle, the float-disk is completely torn from the attached telescopic tube, due to the fact that the projecting disk becomes caught on the restricted neck portion of the receptacle, thereby rendering the lamp totally useless.

The present invention provides an improved form of such automatic device,—one free from the foregoing objection and stronger and more durable in every respect as well as less expensive to manufacture. In the embodiment shown in Figs. 1 to 3, such device comprises a movable tube 10, made up from a section of spring wire wound in the form of a helix, and presenting ribs or projecting thread portions 10ª and intermediate depressions or grooved portions 10ᵇ, the tube, like that of my patent, surrounding the embedded end of the rod 7 and arranged to telescope the fixed water supply-tube 6. Consequently, when the tube 10 is sunk into the carbid in attaching the receptacle 2, the ribs or projecting portions 10ª become engaged by or embedded in the surrounding carbid, which therefore in expanding exerts a direct lifting force on the tube and carries it upwardly therewith. As thus constructed, the telescopic tube presents an exterior surface which is roughened or formed in such manner as to be gripped positively by the carbid in its expansion.

The action of the parts is as follows: As the water issues from the lower end of the fixed supply-tube 6, it passes downwardly through the telescopic tube 10 and issues from the lower end thereof, escaping over the top surface of the head portion 9 of the rod 7. As the carbid slakes under the action of the water, it forms a sludge which tends to clog up the lower end of the tube 10, but the expansion going on causes the unslaked carbid above to be lifted slowly and gradually. As the carbid is thus lifted, the tube 10 is carried upwardly therewith, due as before noted to the engagement of the carbid with the helical threads 10$^a$, thereby breaking up the accumulated sludge so as to allow the water to pass through to the unslaked carbid, and at the same time raising the level at which the escaping water is discharged into the carbid mass. If and when the sludge finally tends to choke up the bottom of the tube, the water will rise within it and overflow onto the upper part of the carbid.

In the embodiment illustrated in Fig. 4, the automatic device is in the form of a movable extension tube 11 of substantially the same dimensions as the tube 10 but having a plain exterior surface throughout, as distinguished from the ribbed or roughened exterior surface of the tube 10. The action of this plain surfaced tube 11 is the same as that of the roughened tube 10, it being found in practice that the slaked carbid makes fast to the sides or bottom of the tube and lifts it slowly and gradually just as in the case of the ribbed tube 10, even though perhaps not so positively.

The invention, therefore, resides broadly in an extension tube slidable freely on the water supply-tube and of a diameter not exceeding that of the head portion of the restricting rod so as to be embedded in the carbid along with said rod, and which extension tube is adapted to be lifted solely by the direct engagement therewith of the surrounding mass of carbid in its expansion under the action of the water and slid upwardly along the water supply-tube.

It will be seen, from the foregoing, that my improved device dispenses entirely with the float-disk employed in the patented construction, and hence obviates the liability to damage rising from the use of such disk. It is not only free from all protruding parts which may become caught in the assembling and disassembling operations, but in addition it is inherently strong and durable and capable of very rough usage. As a result, in the use of my improved device, the life of the lamp is materially prolonged. Furthermore, the device is extremely simple and may be readily manufactured and at little expense. It may also be observed that as to the first embodiment, the flexible character of the device materially facilitates the cleaning thereof, it being merely necessary to flex or distend the spring tube to remove any adhering particles of the slaked carbid. These and various other advantages will be readily appreciated by those skilled in the art.

As before noted, my invention in its broader aspects is not limited to the precise construction shown and described, as many changes may be made in the details thereof without departing from its spirit or sacrificing its chief advantages. Generally speaking, I desire it to be understood that I do not limit myself to any specific form or arrangement except in so far as such limitations are specified in the claims.

The present application is a continuation in part of an application filed by me on February 24, 1920, Serial No. 361,073.

Having thus described my invention, its construction and mode of operation, what I claim and desire to secure by Letters Patent of the United States, is as follows:

1. In an acetylene lamp, the combination of a water reservoir, a carbid receptacle, a water supply-tube leading from the reservoir into the carbid receptacle and terminating at a distance above the bottom of the latter, a restricting rod extending through and below the water supply-tube and terminating near the bottom of the carbid receptacle and provided at its lower extremity with a head portion remote from the water supply tube and adapted to be embedded in the carbid, and an extension tube forming a continuation of the water supply tube and slidable freely thereon and of a diameter not exceeding that of the head portion on the restricting rod so as to be embedded in the carbid along with said rod, the said extension tube being provided with projections wherewith the carbid on expanding when treated with water will engage, causing the tube to be lifted.

2. In an acetylene lamp, the combination of a water reservoir, a carbid receptacle, a water supply-tube leading from the reservoir into the carbid receptacle and terminating at a distance above the bottom of the latter, a restricting rod extending through the water supply-tube and terminating near the bottom of the carbid receptacle and provided at its lower extremity with a head portion adapted to be embedded in the carbid, and an extension tube slidable freely on the water supply-tube and of a diameter not exceeding that of the head portion of the restricting rod so as to be embedded in the carbid along with said rod, the said extension tube being formed on its embedded portion with exterior carbid engaging elements, whereby the carbid in its expansion under the action of the water will lift said extension tube and slide it upwardly along the water supply-tube.

3. In an acetylene lamp, the combination of a water reservoir, a carbid receptacle, a water supply-tube leading from the reservoir into the carbid receptacle and terminating at a distance above the bottom of the latter, a restricting rod extending through the water supply-tube and terminating near the bottom of the carbid receptacle and provided at its lower extremity with a head portion adapted to be embedded in the carbid, and an extension tube slidable freely on the water supply-tube and of a diameter not exceeding that of the head portion of the restricting rod so as to be embedded in the carbid along with said rod, the said extension tube consisting of a section of spring wire wound in the form of a helix, substantially as and for the purpose described.

4. In an acetylene lamp, the combination of a water reservoir, a carbid receptacle, a water supply-tube leading from the reservoir into the carbid receptacle and terminating at a distance above the bottom of the latter, a restricting rod extending through and below the water supply-tube and terminating near the bottom of the carbid receptacle and provided at its lower extremity with a head portion remote from the water supply tube and adapted to be embedded in the carbid, and an extension tube forming a continuation of the water supply tube and slidable freely thereon and of a diameter not exceeding that of the head portion of the restricting rod so as to be embedded in the carbid along with said rod, the said extension tube being provided with an exterior lifting surface directly engageable by the surrounding mass of carbid, whereby the carbid on expanding when treated with water will slide the extension tube upwardly along the water supply-tube.

In testimony whereof, I have affixed my signature hereto.

JOHN M. BROCK.